May 21, 1929. H. B. PHILIPS 1,713,712
AUTOMOBILE DRIVING TRANSMISSION
Filed Feb. 17, 1926 3 Sheets-Sheet 2
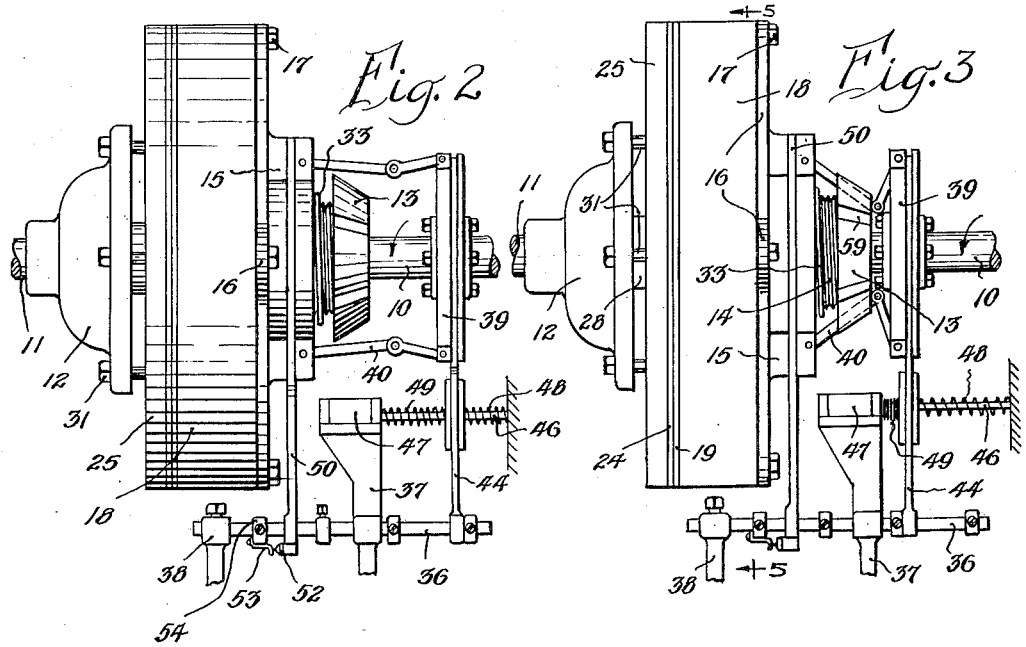
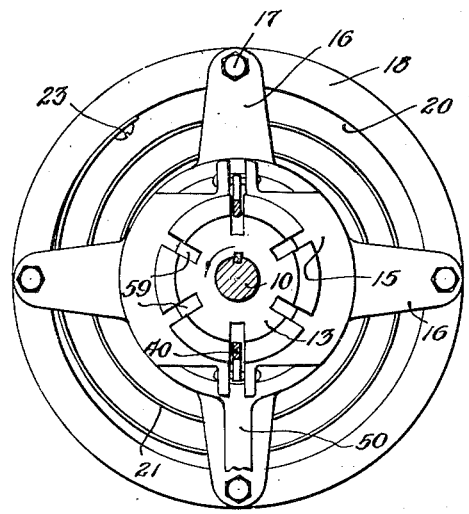
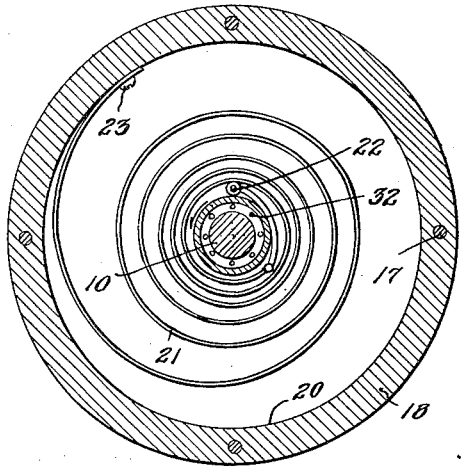
Fig.4 Fig.5
Inventor
H. B. Philips
By his Attorney May 21, 1929.   H. B. PHILIPS   1,713,712
AUTOMOBILE DRIVING TRANSMISSION
Filed Feb. 17, 1926   3 Sheets-Sheet 3
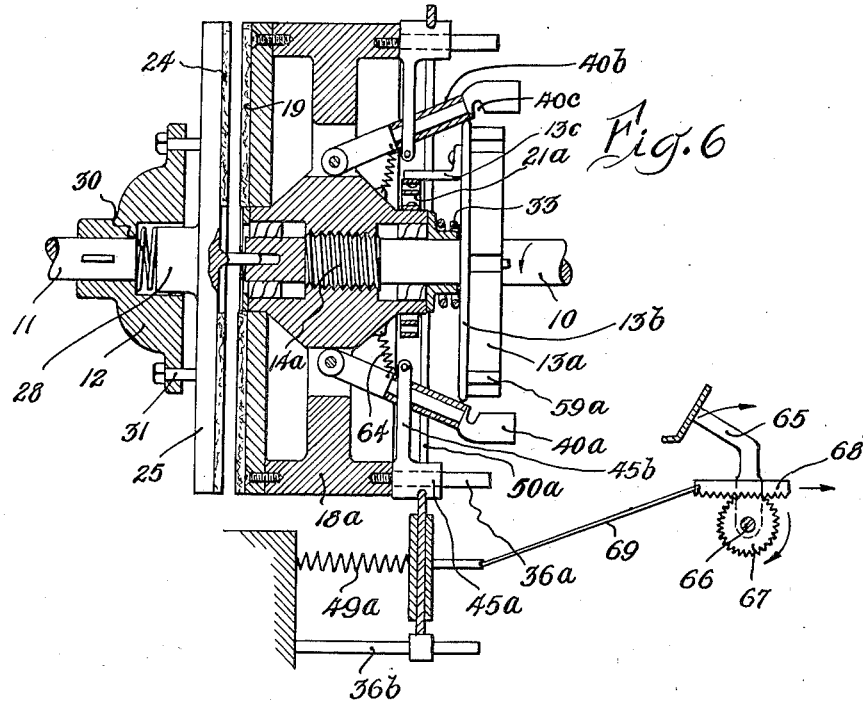
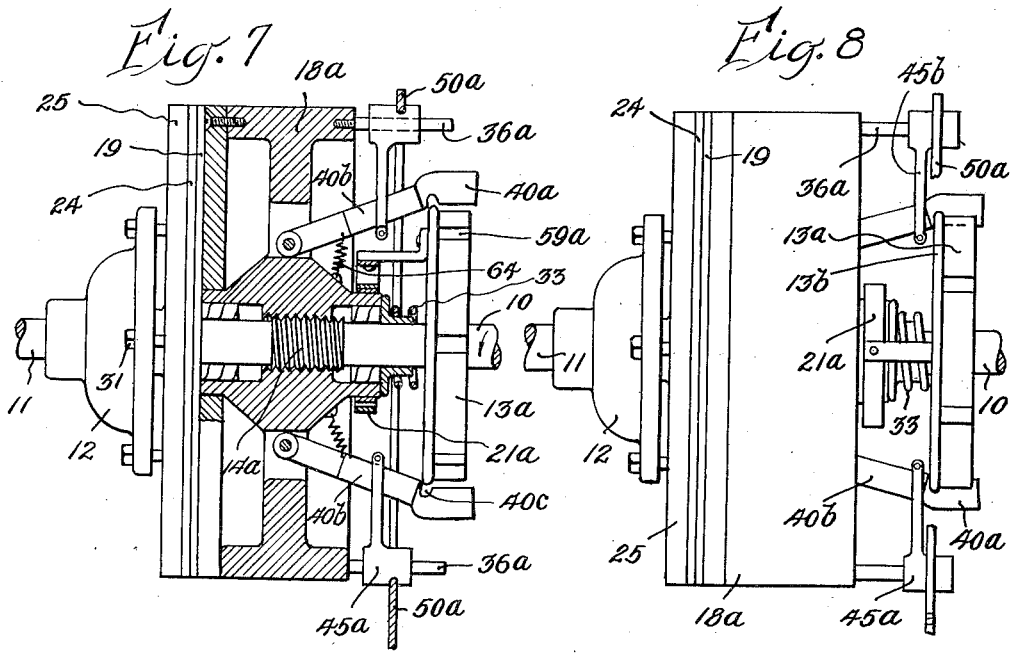
INVENTOR
H. B. Philips
BY
Geo. L. Beeler
ATTORNEY Patented May 21, 1929.

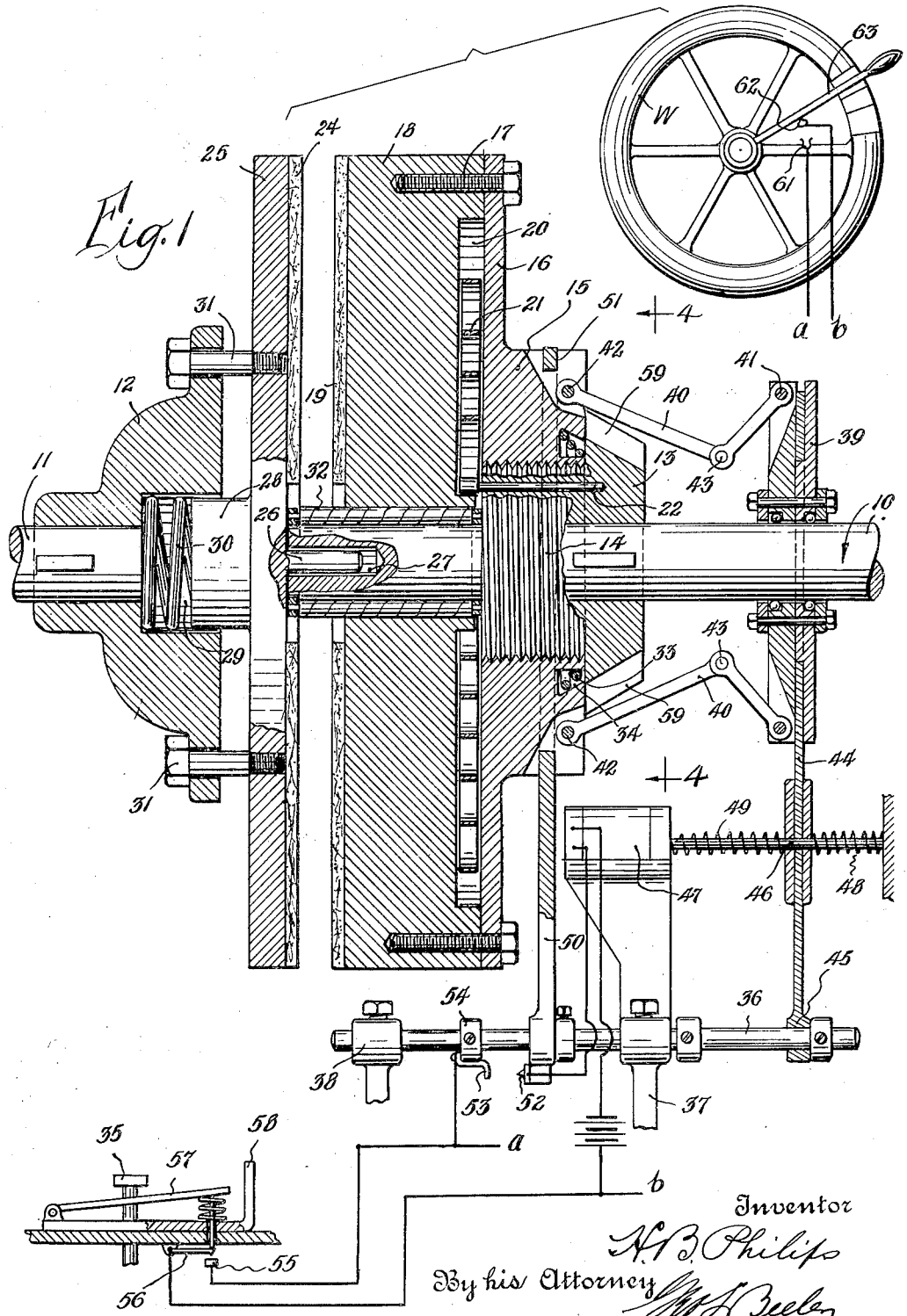

1,713,712

UNITED STATES PATENT OFFICE.

HERMAN B. PHILIPS, OF NEW YORK, N. Y.

AUTOMOBILE DRIVING TRANSMISSION.

Application filed February 17, 1926. Serial No. 88,736.

This invention relates to power transmitting mechanism and has particular reference to coupling devices or clutches for connecting the power or driving mechanism to the driven mechanism in an automatic manner.

More specifically stated, one purpose of the invention is to provide an automatic clutch mechanism for automobiles or other analogous machines, the mechanism being so constructed that the clutch will be effective to connect the driving and driven mechanisms as a direct result of the starting and speeding up of the engine, subject, however, to the usual manipulation of the gear shift mechanism.

Another object of the invention is to provide clutch mechanism for power driven vehicles of such a nature that one foot lever may be omitted from the usual equipment and whereby the control of the machine may be facilitated and made more effective or flexible than at present.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings in which like reference characters designate the same parts in the several views, and in which—

Figure 1 is a vertical longitudinal section of a preferred embodiment of my invention including also diagrams indicating the electric connections.

Fig. 2 is a side elevation of the same mechanism on a reduced scale and indicating the clutch in engaged position.

Fig. 3 is a similar view indicating the clutch locked in engaging position.

Fig. 4 is a vertical transverse section about on the line 4—4 of Fig. 1.

Fig. 5 is a vertical transverse section on the line 5—5 of Fig. 3.

Fig. 6 is a vertical longitudinal section of a modified form of the invention.

Fig. 7 is a similar view of the same with the clutch in set position.

Fig. 8 is a side elevation of the same mechanism but with the clutch locked in set position.

Referring now more specifically to the drawings, 10 indicates a motor or power shaft which may be assumed to have a constant driving direction as per arrow marked thereon, and in alignment with said power shaft is a driven shaft 11 to which is connected a head 12. In automobile practice it will be understood that the shaft 11 has co-operation with any well known or suitable change speed mechanism not shown.

Fixed to the shaft 10 for rotation therewith is a hub 13 which is formed integral with or has connected rigidly thereto an extension having an external thread 14 for cooperation with a spider 15 having a series of radially directed arms 16. Adjacent to the spider and fixed rigidly thereto as by means of screws 17 is a fly wheel 18 serving not only its usual function as a fly wheel, but constituting also the primary member of the clutch, having a flat frictional surface 19 on the side thereof remote from the spider. Adjacent to the spider the fly wheel is provided with a cavity or recess 20 in which is secured a spiral spring 21, the inner forward end of which is connected to a pin 22 fitted slidably in the hub 13 while the rear or outer end of the spring is attached at 23 to the fly wheel.

Mating with the clutch face 19 is a similar face 24 carried by a disk 25 disposed between the adjacent ends of the shafts 10 and 11. The disk is provided with a centering pin 26 fitted in a similarly formed cavity or seat 27 in the end of the shaft 10, while on the opposite side thereof the disk is provided with a hub 28 fitted in a cavity 29 of the aforesaid head 12, but between the hub 28 and shaft 11 is fitted a heavy cushion spring 30. The disk 25, while having a limited sliding movement toward or from the head 12 is fixed from rotation independently thereof by means of a series of pins or bolts 31 whereby the frictional grip between the fly wheel and the disk will be communicated to the shaft 11 through the head 12. Any suitable antifriction bearings or rollers may be inserted as at 32 between the fly wheel and the shaft 10 around which the fly wheel may have movement independent of the shaft.

So far as has been described the action is as follows: Upon rotation of the shaft 10 and threaded hub 13 secured thereto, the spider 15 and fly wheel secured thereto will be caused to move away from the hub 13 or toward the disk 25, the inertia of rest of the fly wheel tending to hold it stationary, while the threaded hub 13 tends to unscrew from the spider.

The shaft 10 and hub 13 being held from endwise movement by suitable bearings, the camming action of the threads at 14 will tend to force the fly wheel in the direction just stated. While this action takes place the pin 22 to which the inner end of the spring 21 is connected will slip along its seat in the hub. In other words, the spring is housed effectively between the spider and the fly wheel, causing the pin to move or remain with it in the same relative position. The spring 21 is of but moderate strength, not sufficient to compel the fly wheel to move at all times with the shaft 10. Ordinarily as the engine accelerates the spring will not be sufficient to retard the rotation of the fly wheel to such an extent as to prevent its gripping the disk 25, but the main purpose of the spring 21 is to make a resilient connection between the fly wheel and the driving shaft and so to permit the clutch to remain open while the engine is idling and the machine as a whole remains stationary, the spring at such time serving to keep the two clutch members 19 and 24 in spaced relation to each other through its retarding action on the flywheel. The moment, however, the engine shaft is speeded up to a substantial rate of speed higher than that of the driven shaft or clutch disk 25, the clutch engagement will result. Whereas in the usual automobile practice the normal position of the clutch is set, in this improvement the normal position is as shown in Fig. 1 with the clutch disconnected. A cushion spring 33 in the nature of a coil as shown is interposed between the spider and the driving shaft hub 13 as, for instance, in an annular recess 34 formed in the face of the spider. The purpose of this spring is to prevent the spider from impinging too vigorously against the hub 13 on the recoil of the spring 21 or when the speed of the engine is reduced below that of the movement of the vehicle or driven shaft.

When the car is to be started the low speed shift of the transmission mechanism may be put into operation, and then upon the starting of the engine and the speeding up of the shaft 10, the fly wheel 18 will move toward and grip the clutch disk 25. This setting of the clutch will be moderate or without shock because of the spring connections at 21 and cushion 30. When the engine is stopped or reduced in speed with a corresponding action of the shaft 10, the speed or momentum of the machine being communicated from the shaft 11 to the fly wheel will cause the latter to move along the threaded hub to or toward the position shown in Fig. 1, a condition that will be facilitated by the recoil action of the spring 21. This is true when idling of the engine as when going down a grade. In other words, the tendency of the car to run ahead of the engine will serve automatically to disconnect the clutch, thereby resulting in the saving of a large amount of fuel without special attention on the part of the operator. As soon as an up grade is reached or it is desired to increase the speed of the car the engine will be speeded up in the usual manner as by stepping upon the accelerator 35.

36 indicates a guide rod parallel to the shaft 10 held in fixed position as by stationary brackets 37 and 38. 39 indicates a collar surrounding the shaft 10 and movable endwise thereof to cause it to partake of the rotation of the fly wheel and spider by means of a plurality of toggle links 40 pivoted to the collar at 41 and to the spider at 42, the links being adapted to break inward toward each other and the shaft 10 at the joints 43. The collar is held normally from movement by virtue of a yoke 44 having slidable or guided relation upon the rod 36 at 45, but fixed to a bar 46 between and parallel to the shaft 10 and rod 36, said bar being in the nature of a core of an electromagnet 47 carried by the bracket 37. A pair of springs 48 and 49 surround the core 46 on opposite sides of the yoke whereby the yoke is normally held in the position shown in Fig. 1. Sometimes it is desirable to maintain the clutch in connected or set position even though the engine speed is lower than that of the vehicle or driven shaft 11. Consequently the facilities above described are availed of for this purpose. A yoke 50 surrounds the spider 15 in an annular groove 51 and moves always endwise of the shaft 10 with said spider. Consequently when the clutch is set two normally spaced contact points 52 and 53 are brought together as shown in Figs. 2 and 3, these points being carried respectively by the yoke 50 and a collar 54 fixed to the rod 36. Thus the circuit is completed through the line $a$, magnet 47, and line $b$. Two other contact points 55 and 56 are normally spaced which must be brought together to completely close the circuit through the magnet. These last mentioned contact points are adjacent to the accelerator or a pedal 57 which may be depressed by the driver either with or without depressing the accelerator according to the lateral rolling or tilting of his foot at the region of the foot rest 58. If now he wishes to lock the clutch in set or connected position irrespective of the relative speeds of the engine and car he simply depresses the pedal 57, closing the circuit at 55. The magnet therefore will draw the yoke 44 toward it as shown in Fig. 3, breaking the toggle links inward and causing the longer arms thereof to enter certain of the notches 59 formed in the periphery of the hub 13, thereby locking positively the fly wheel, spider, and hub together as a unit, this being true irrespective of the gap or space between the spider and the hub. As an alternative means of locking the clutch the two lines $a$ and $b$ may be closed at the contacts 61 and 62 mounted respectively on the wheel W and a movable finger lever 63 whereby the magnet may be energized either from the foot or the hand. When, however, the magnet is de-energized the spring 49 throws the collar 39 forward to its normal position, withdrawing the toggle arms from the notches 59.

In the modified form shown in Figs. 6 to 8 I provide a mechanical, instead of electrical, means for controlling the setting of the clutch or holding it in locked position irrespective of the disparity in rates of speed of the engine and car. While the main principle and operative features of the construction remain the same there are several minor differences in detail of construction which will now be referred to more specifically.

The hub $13^a$ is fixed to the shaft 10 as before described and the cushion spring $21^a$ is attached to a bracket $13^c$ at one end and at the other end to the extension of the hub of the fly wheel $18^a$. The hub $13^a$ is provided with a series of notches $59^a$, but adjacent to said notches the hub is provided with a smooth flange $13^b$ which extends outward somewhat from the main portion of the hub. Pivoted to the fly wheel so as to swing radially inward or outward with respect thereto are a series of dogs $40^a$ designed to enter the notches in the hub $13^a$ when the clutch is set so as to hold the same locked as in Fig. 8. These dogs are provided with deep notches $40^c$ which receive the flange $13^b$ when the notches are entered. The dogs are moved inward toward the shaft 10 by virtue of springs 64 the strength of which is superior to the centrifugal force of the fly wheel which might tend to throw them outward out of locking position. A yoke $50^a$ surrounding the fly wheel or a spider mechanism $45^a$ attached thereto, but slidable laterally thereof along a series of pins $36^a$, is held normally spring pressed toward the fly wheel by virtue of a spring $49^a$ while the yoke slides along a guide rod $36^b$. The spider structure $45^a$ includes a series of inwardly directed arms $45^b$ each of which embraces one of the arms or dogs $40^a$ where it is provided with an antifriction roller $40^b$. The action of the spring $49^a$ therefore as shown in Fig. 6 serves to hold the dogs outward from one another, the force of the spring $49^a$ being superior to that of the springs 64. When, however, the clutch is set as in Fig. 7, and the driver wishes to lock the clutch in such position, he presses forward on the foot pedal 65 pivoted at 66 and to which is fixed a pinion 67, the teeth of the pinion causing a forward movement of a rack 68 between which and the yoke $50^a$ extends a rod or link 69. Thereby the yoke $50^a$ is moved forward as shown in Figs. 7 and 8, the latter figure showing the extreme position in which the spider arms $45^b$ release the dogs for their inward movement under the force of the springs 64. The flange $13^b$ co-operating with the rollers $40^b$ serves to hold the dogs out of locking or engaging position with respect to the notches in the hub $13^a$ except when it is desired to lock the clutch as above described. The roller engagement between these parts insures freedom of action irrespective of the difference in speeds of the fly wheel and shaft 10.

From the nature of the foot mechanism shown and described herein, whether electrical or mechanical, it will be appreciated that the means for locking the clutch mechanism set or gripped constitutes in effect a foot rest. In other words, a driver under normal operating conditions may rest his foot freely upon the pedal, thereby holding the clutch in locked or set position and in position to depress the accelerator or not as he sees fit. When it is desired to release the clutch as when coasting he simply removes his foot from the pedal.

I claim:

1. The herein described driving gear comprising a driving shaft, a driven shaft, a clutch member mounted upon the driving shaft and adapted to have independent rotation with respect thereto within prescribed limits, a companion clutch member fixed to the driven shaft for rotation therewith, means acting between the driving shaft and the first mentioned clutch member to cause such clutch member to move endwise of the shaft into frictional engagement with the companion clutch member as a result of a change of speed of the driving shaft with respect to the clutch member carried thereby, and means to lock the first mentioned clutch member against movement relative to the driving shaft.

2. Mechanism as set forth in claim 1 in which the means for moving the clutch member endwise includes a threaded hub fixed to the driving shaft, the first mentioned clutch member having a part threaded on said hub for endwise movement as aforesaid, the locking means acting to lock the first-mentioned clutch member to said hub.

3. Mechanism as set forth in claim 1 in which the companion clutch member is so fixed to the driven shaft as to have a cushion affording a limited endwise movement thereof with respect to the driven shaft, said cushion including a spring positioned in a hub fixed to the driven shaft, said hub having means to cause rotation of said companion clutch member.

4. Mechanism as set forth in claim 1 in which the driving shaft is in alignment with the axis of the driven shaft and companion clutch member carried thereby, and said clutch members are provided each with a facing of fibrous friction material.

5. In mechanism of the character set forth, the combination of a driving shaft, a driven shaft, two clutch members mounted respectively on said shafts, means to cause the clutch members to engage each other for driving connection as a result of the speeding up sufficiently of the driving shaft and to permit the clutch members to disengage when the driven shaft is speeded up ahead of the driving shaft, and cushioning means between the driving shaft and the clutch member carried thereby serving to prevent excessive shock as a result of the racing forward of such clutch member with respect to the driving shaft.

6. In automatic clutch mechanism as set forth herein, the combination of a driving shaft, a clutch member carried thereby, a driven shaft, a companion clutch member carried thereby, all said parts being coaxial, means to cause said clutch members automatically to engage each other for driving connection between the two shafts when the driving shaft is speeded up, said engaging means releasing automatically when the driven shaft tends to run ahead of the driving shaft, a spring of moderate strength being provided between the driving shaft and the clutch member carried thereby serving to prevent engagement of the clutch member during the normal idle running of the driving shaft.

7. In automatic clutch mechanism as set forth herein, the combination of a driving shaft, a driven shaft, clutch members connecting said shafts, means to cause the clutch members to automatically engage each other for driving connection when the driving shaft is speeded up, and causing said clutch members to automatically release when the driven shaft runs ahead of the driving shaft, pivoted means to lock the clutch members against relative movement, and electrical actuating means for the locking means.

8. In mechanism of the character described, the combination of a driving shaft, a clutch member carried thereby, a driven shaft, a companion clutch member carried thereby, means to cause the clutch members to engage when the driving shaft is speeded up, said means including a hub member on which said clutch member is threaded for rotation and movement longitudinally of its shaft, said hub member being fixed to the driving shaft, and means to lock the clutch member against rotation including toggle links, a sliding rotatable member mounted on the driving shaft and movable longitudinally thereof, said toggle links having connection between the clutch member and the sliding member, and means to move the sliding member toward the clutch member to move the toggle links inward into engagement with said hub to hold the clutch member against rotation with respect thereto.

9. In automatic clutch mechanism as set forth herein, the combination of a driving shaft, a clutch member carried thereby, a driven shaft, a companion clutch member carried thereby, all said parts being coaxial, means to cause said clutch members automatically to engage each other for driving connection between the two shafts when the driving shaft is speeded up, said engaging means releasing automatically when the driven shaft tends to run ahead of the driving shaft, and means to lock the clutch members in engagement, the means for causing the automatic engagement between the clutch members consisting of a threaded hub fixed to the driving shaft and co-operating with a similarly threaded part of the clutch member mounted thereon, actuating means being provided for the locking means movable longitudinally of the shafts.

In testimony whereof I affix my signature.

HERMAN B. PHILIPS.